United States Patent [19]

Klueting et al.

[11] 4,366,983
[45] Jan. 4, 1983

[54] POWER RECLINER

[75] Inventors: Bernd A. Klueting, Radevormwald, Fed. Rep. of Germany; Daniel R. Boyer, Battle Creek, Mich.

[73] Assignee: Keiper U.S.A., Inc., Battle Creek, Mich.

[21] Appl. No.: 172,161

[22] Filed: Jul. 25, 1980

[51] Int. Cl.³ .............................................. A47C 1/025
[52] U.S. Cl. ..................................... 297/362; 74/425; 297/330
[58] Field of Search ................... 297/362, 330; 74/425

[56] References Cited

U.S. PATENT DOCUMENTS 2,668,581 2/1954 Luketa ............................ 297/362 X
4,217,788 8/1980 Burr et al. .............................. 74/425
4,304,386 12/1981 Nagashima et al. ............ 297/362 X

FOREIGN PATENT DOCUMENTS 2323314 11/1974 Fed. Rep. of Germany ........ 74/425

Primary Examiner—William E. Lyddane

[57] ABSTRACT

The invention concerns a hinged recliner for seats with adjustable seat backs, especially automobile seats, where a fixed hinge part attached to the seat, and a swingable hinge part attached to the seat back are connected via an axis of rotation, and where an adjustment and locking device, designed on a taumel gear principle, determines the position of both hinge parts to each other and the eccenter of the taumel gear system is connected to a power device through the mediation of a reduction gear by means of a flexible shaft.

6 Claims, 4 Drawing Figures

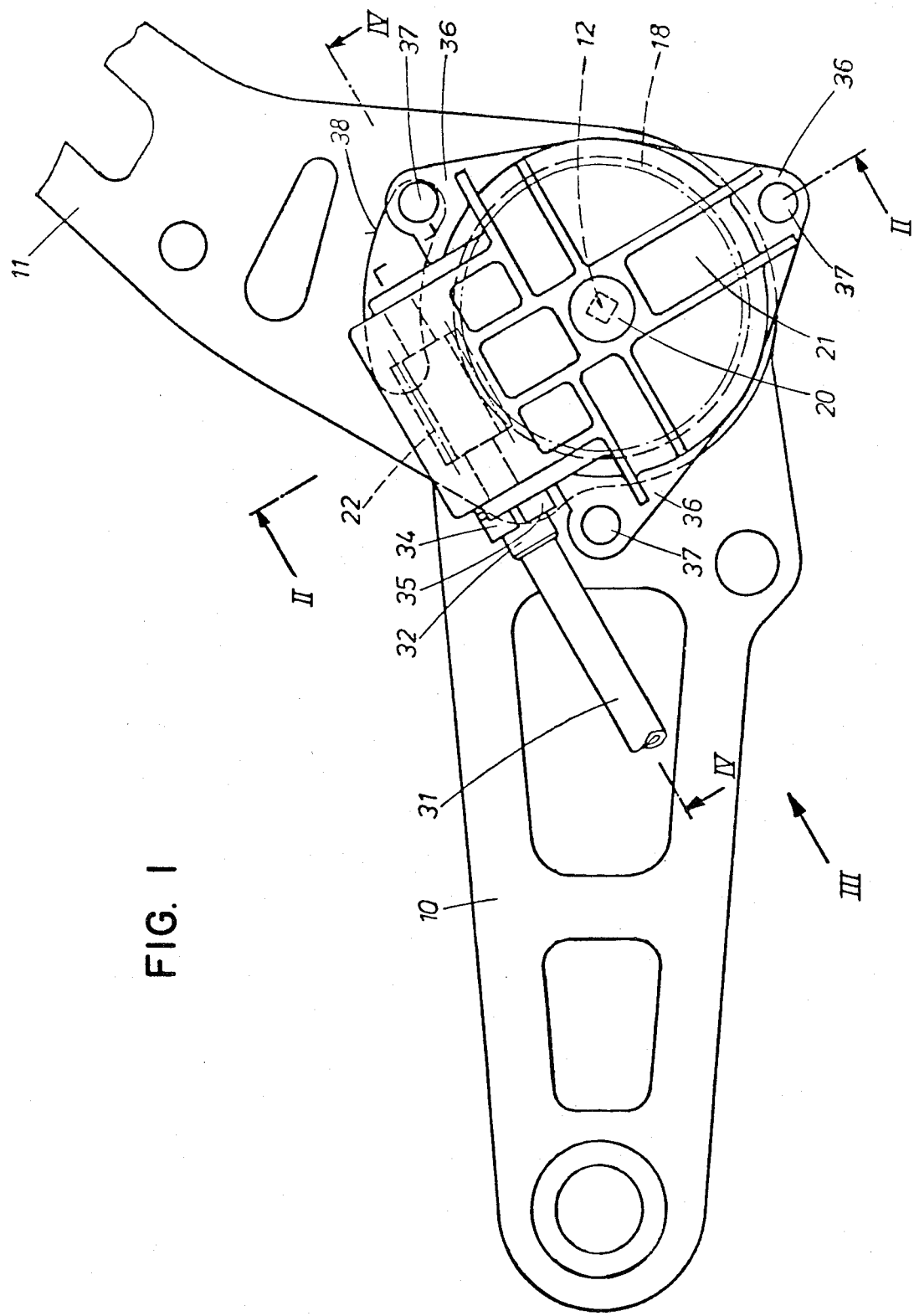
FIG. I

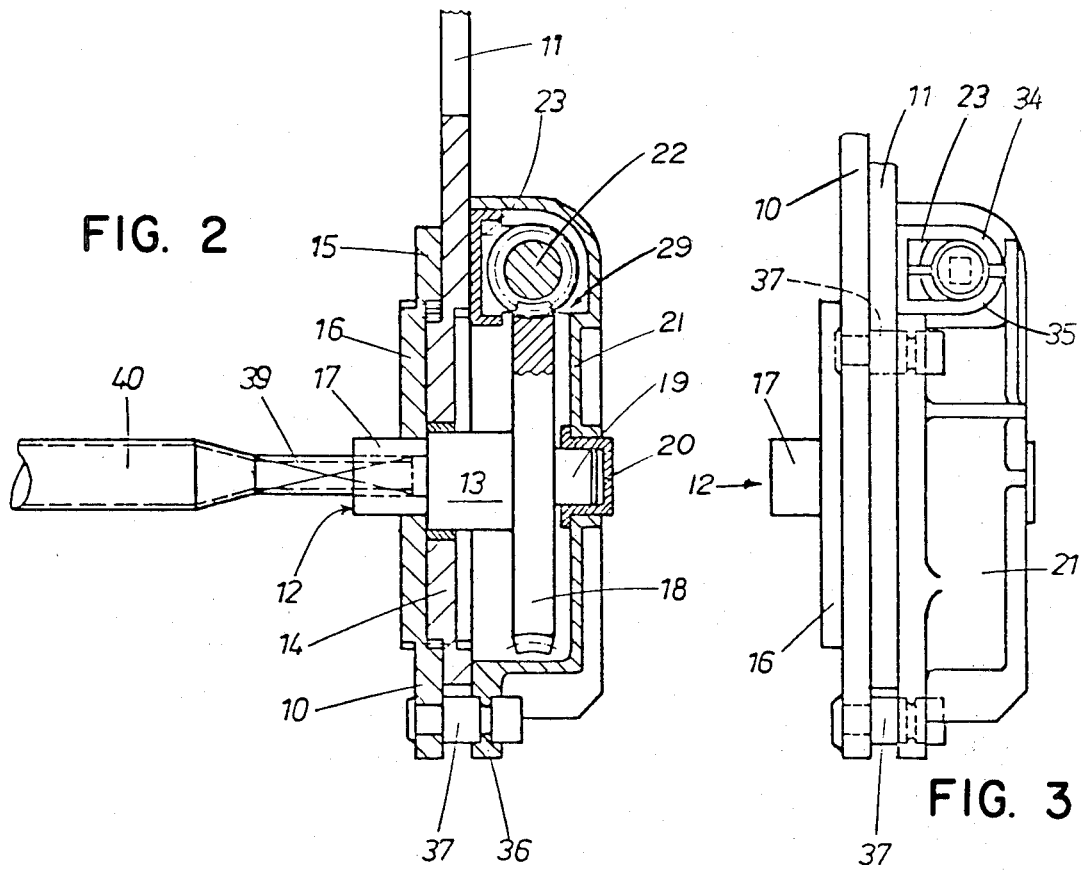
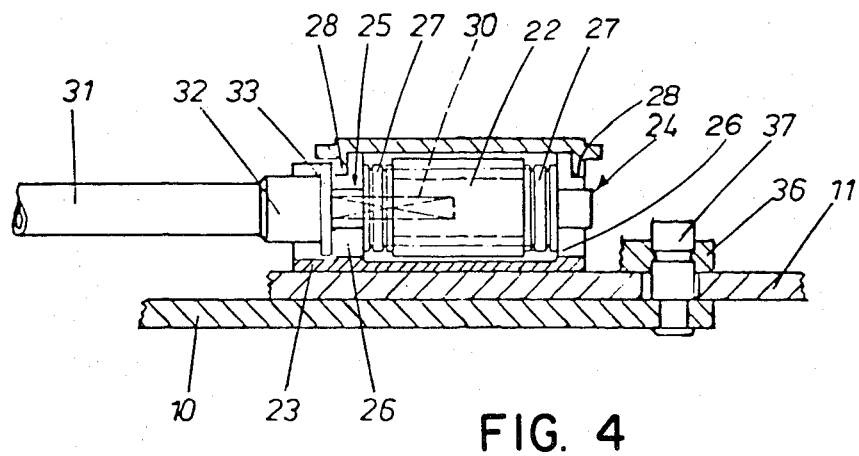

POWER RECLINER

BACKGROUND OF THE INVENTION

In a known hinged recliner of the taumel type the eccentric axis of rotation is connected to a motor by means of a flexible shaft. In order for the motor to be effective at reduced speed on the axis of rotation a reduction gear box is interpositioned between the motor and the axis or rotation and flanged onto the motor as a unit. Since the axis of rotation cannot be connected to the flexible shaft on the outside of the hinged recliner due to the amount of space it takes up, the flexible shaft is rotationally interlocked with the axis of rotation on the inside of the hinged recliner. This inside cannot be used any more as space for the connection between the hinged recliner on one side of the seat and the hinged recliner of the other side by means of a transmitting shaft. In order that the recliner on the one seat side is in a synchronized way rotationally interlocked with the recliner on the other seat side, two flexible shafts run from the unit composed of the motor and the reduction gear box. One of these flexible shafts runs to the recliner on one seat side and the other runs to the recliner on the other seat side. In order to avoid a moving ahead or falling behind of one recliner over the other, both flexible shafts leading from the gear motor are the same length. This type of rotational interconnection between the motor and the two recliners is very costly, however. Even the gear mechanism design has to follow the demands of the identical direction of rotation of the axes of rotation on the two opposite hinged recliners and is therefore costly. In addition to this the support of the swingable hinge part is a cantilever type i.e. overhung on the centrical part of the axis of rotation, which could lead to additional compulsive forces on the gears.

In a further also known but exclusively manually operated hinged recliner one hinged part is fixed to a bearing plate which together with the connected hinged part supports itself on concentric to each other arranged portions of the axis of rotation with the other hinged part enclosed through lateral overlapping. Because of the supporting force distribution on two portions of the axis of rotation, a cogging effect between one hinged part and the other hinged part does not occur so that the gear tooth system of the manually adjustable hinged recliners are free of compulsive forces.

SUMMARY OF THE INVENTION

The purpose of the invention at hand is to produce a motor driven hinged recliner of the aforementioned type where on the one hand complete freedom of the gear tooth system from compulsive forces through swing of the hinged parts is avoided and where on the other hand it is possible to connect a driving shaft to transmit the rotation to the opposite recliner side.

The assignment is solved invention wise in that a gear box enclosed worm gear system is attached to the fixed hinge part with an open side of the gear box overengaging the other pivot part in its tooth area. This worm gear not only accomplishes the reduction of the motor speed but also has the reinforcing function of the bearing plate in that the housing of the worm gear is fastened to the one hinged part which overlaps the other hinged part in the pivot area while one section of the axis of rotation is supported in the gear housing, and the concentrically arranged section of the axis of rotation located opposite to it, is likewise mounted in the hinged part connected to the housing. The eccenter sector located between the concentric sections of the axis of rotation supports the hinged part which is preferably attached to the seat back, while the hinged part which is connected to the gear housing and concentrically supports the axis of rotation is preferably connected to the seat part.

To achieve the goal of a simple gear construction a developmental characteristic of the invention is that the worm, positioned by means of a thrust bearing in a bearing cage, is installed with the bearing cage into the gear housing as a preassembled unit. Thereby the thrust bearings—which have preferably been designed as roller bearings in order to improve the efficiency—take up the thrust of the worm and pass it on through the bearing cage to the gear housing and from there to the gear housing preferably by a three point mounting attached to the seat connected fixed pivot part.

A simple mounting of the flexible shaft which connects the worm to the gear housing is achieved through a further design characteristic of this invention, in that the bearing cage shows two specifically spaced plastic clips adjoining a bearing. The clips embrace a collar bushing of the flexible shaft, whereby the collar is fixed between the front side of the clip, which faces the bearing, and the front side of the bearing in the bearing cage. Thereby the fixing of the bearing cage to the gear housing is achieved through the fixing of the gear housing to one of the two pivot parts itself, in that the gear housing is provided with protrusions which on the one hand support the worm containing bearing cage in axial as well as radial direction and on the other hand engage in recesses of the bearing cage.

According to a further design characteristic of the invention an especially simple construction of the hinged recliner is achieved in that the worm gear and the eccenter are, as a unit, rotationally interlocked with the axis of rotation. Thereby the axis of rotation is supported advantageously on the one hand in the fixed hinge part and on the other hand in the housing of the worm gear.

The invention is shown in one application in the drawings and will be described more exactly in the following.

BRIEF DESCRIPTION OF THE DRAWINGS

FIG. 1 is a side view of the hinged recliner according to the invention;

FIG. 2 is a hinged recliner shown in FIG. 1 in a section according to line II—II in FIG. 1;

FIG. 3 is a hinged recliner shown from the direction of arrow III shown in FIG. 1; and FIG. 4 is a hinged recliner shown in a section according to IV—IV of FIG. 1.

The hinged recliner shown in the drawing has a pivot part 10 which is fixed to the seat (not shown) and a swingable pivot part 11 which is connected to the seat back (also not shown). These two pivot parts are connected with each other by means of an axis of rotation 12. This axis of rotation 12 has an eccentric portion in its center area on which a spur gear 14 is pivoted, which is stamped, through fine blanking for example, out of the swingable pivot part. The fixed pivot part 10 which is connected to the seat has an inner gear 15 whose teeth mesh with the spur gear 14, and whose root diameter is at least one tooth height larger than the head diameter of the spur gear 14. Also the number of teeth of the inner gear 15 is at least one tooth greater than the number of teeth on the spur gear 14. The inner gear 15 can also be produced through fine blanking, through which the wall part which bridges over the inner gear is formed, in which hole, concentric to the inner gear, a concentric pivot of the axis of rotation is fixed. In drawing 2 on the right side a worm gear 18 connects with the eccenter section 13. The worm gear is rotationally interconnected with the axis of rotation and concentric to pivot 17. Over the worm gear 18, a further pivot 19 of the axis of rotation 12 protrudes. This pivot 19 is arranged concentrically to pivot 17 of the axis of rotation. While the pivot 17 of the axis of rotation 12 supports itself in the fixed pivot part 10, the pivot 19 is supported through the mediation of a pivot bushing 20 in the housing 21 which is connected to the fixed pivot part. The worm gear 18 is engaged by a worm 22 which in turn can rotate in a bearing cage. In order to form two bearings 24 and 25 for the worm, the bearing cage has two plastic clips, which are positiond at such a distance to the front sides of the worm 22 that between the corresponding front side of the worm 22 and the clip 26 there is enough space to position for instance a thrust bearing designed as a roller bearing. The bearing cage 23 containing the worm 22 and thrust bearing 27 has recesses on the outside of its clips 26 into which the protrusions 28 of the housing 21 engage in such a way that the worm 22 and the worm gear is positioned in the housing 21 in accordance with the necessary center distance between the worm and worm gear, and is also fixed in this position required to form the worm gear train.

One of the two pivot pins of the worm 22 has an unround opening in which a cam 30, in its cross section also unround, is engaging. The cam is connected to a not depicted motor by means of a flexible shaft 31. At the end area of the protective casing of the flexible shaft there is a collar bushing which can be fixed by means of its collar to the bearing cage. In order to fix the collar bushing the bearing cage is supplied with two clips 34 and 35 which are positioned, according to the thickness of the collar, the corresponding distance from the outer front side of the plastic clips 26 forming the bearing 25.

The gear housing 21 has along its circumference three equally spaced (radial) attachment flanges 36, in which rivet bolts 37 are solidly imbedded. These rivet bolts, which show a shoulder height according to the material thickness of the swingable pivot part 11, are solidly connected to the fixed pivot part attached to the seat, and thereby mount the gear housing 21 to the fixed pivot part 10, where between the fixed pivot part 10 and the gear housing the swingable pivot part 11 is mounted movably on the eccenter portion 13 of the axis of rotation 12. As one can see from FIG. 1, the upper rivet bolt 37 penetrates an oblong hole curved around the midpoint of the axis of rotation in the swingable pivot part, whereby the width of the oblong hole is twice the eccentricity larger than the diameter of the shaft of the rivet bolt. This oblong hole may also serve as swing limitation for the pivot part 11 and the seat back connected to it.

The described motor driven hinged seat back adjuster with the worm drive needs to be installed on only one side of the automobile seat, while on the opposite side of the automobile seat it is advantageous to have a hinged recliner without worm drive. In order to transmit the rotation from the motor driven recliner to the following recliner, the axes of rotation 12 have in their concentric pivot 17 a nonround hole in which a transmitting shaft 60 with nonround cams 39 engages.

The flexible shaft 31 can at any time be released with its collar bushing from its connection with the bearing cage 23 by means of a slit between the clips 34 and 35 through which they can be bent apart so that the flexible shaft can be pulled from the bearing cage fixed to the gear housing. In the same way a flexible shaft can be reconnected to the bearing cage 23.

Through the not pictured motor, which can be an electric motor for example, by means of the flexible shaft 31 and its cams 30 the worm 22 is made to turn. The worm 22 then turns the worm gear 18. The eccenter portion 13 of the axis of rotation 12 turns with the worm gear 18, through which the mesh zone between the spur gear 14, which is movably mounted on the eccenter section 13 of the swingable pivot part 11, and the nonmoving inner gear 15 of the fixed pivot part 10 is also brought into rotation. During one rotation of the axis of rotation 12 there is also one rotation of the mesh zone of the gears. However, since in the described example the number of teeth between the spur gear 14 and the inner gear 15 are different by one, the axis of rotation of the swingable pivot part 11 moves one tooth further relative to the fixed pivot part 10 during one revolution of the axis of rotation 12. Since the rotational movement of the recliner with the worm drive 29 is transmitted by means of the transmitting shaft 40 to the opposite, not-pictured recliner, the same rotational movement results there as in the pictured and described recliner. After turning off the electric motor, the swingable pivot part 11 will stay in its adjusted position due to self-locking of the eccentrically located spur gear 14.

As has already been mentioned, the described instance shows only one example of the invention, which in no way can be limited to that. There are rather more various different designs and arrangements of this invention possible.

We claim:

1. Hinged recliner for seats with adjustable seat backs, specifically for automobile seats, where a fixed hinge part attached to the seat, and a swingable hinge part attached to the seatback are connected via an axis of rotation, and where an adjustment and locking device, designed on a taumel gear principal, determines the position of both hinge parts to each other and the eccenter of the taumel gear system is connected to a power device through the mediation of a reduction gear by means of a flexible shaft, wherein said recliner is characterized by a gear box enclosed worm and worm gear means attached to the fixed hinge part (10) with an open side of the gear box overengaging the other pivot taumel part (11) in it's tooth area.

2. The hinged recliner of claim 1 is characterized in that the worm (22), positioned by means of a thrust bearing (27) in a bearing cage (23), is installed with the bearing cage into the gear housing (21) as a preassembled unit.

3. The hinged recliner of claim 2 is characterized in that the bearing cage (23) shows two specifically spaced plastic clips (34,35) adjoining a bearing (25). The clips embrace a collar bushing (32) of the flexible shaft (31), whereby the collar (33) is fixed between the front side of the clip, which faces the bearing, and the front side of the bearing in the bearing cage.

4. The hinged recliner of claim 2 or 3 is characterized in that the gear housing is provided with protrusions which on the one hand support the worm containing bearing cage in axial as well as radial direction and on the other hand engage in recesses of the bearing cage.

5. The hinged recliner of claim 2 or 3 is characterized in that the worm gear and the eccenter are, as a unit, rotationally interlocked with the axis of rotation.

6. The hinged recliner of claim 5 is characterized in that the axis of rotation (12) is located on the one side in the fixed hinge part (10) and on the other side in the housing (21) of the worm gear (29).

* * * * *